Feb. 18, 1964 J. P. LAMB 3,121,840
ELECTRICAL LOGGING SYSTEM WITH MEANS FOR
TRANSMITTING DIFFERENT CURRENTS OVER
A SINGLE PAIR OF CONDUCTORS
Filed Dec. 30, 1959 2 Sheets-Sheet 1
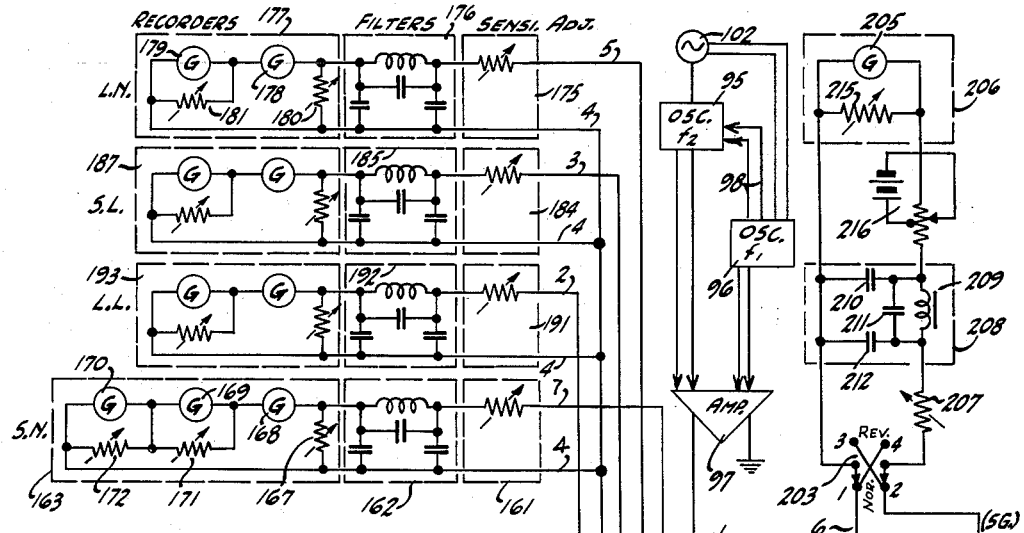
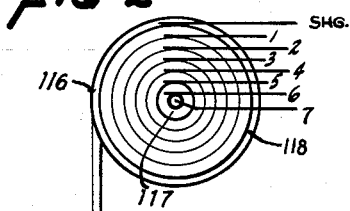
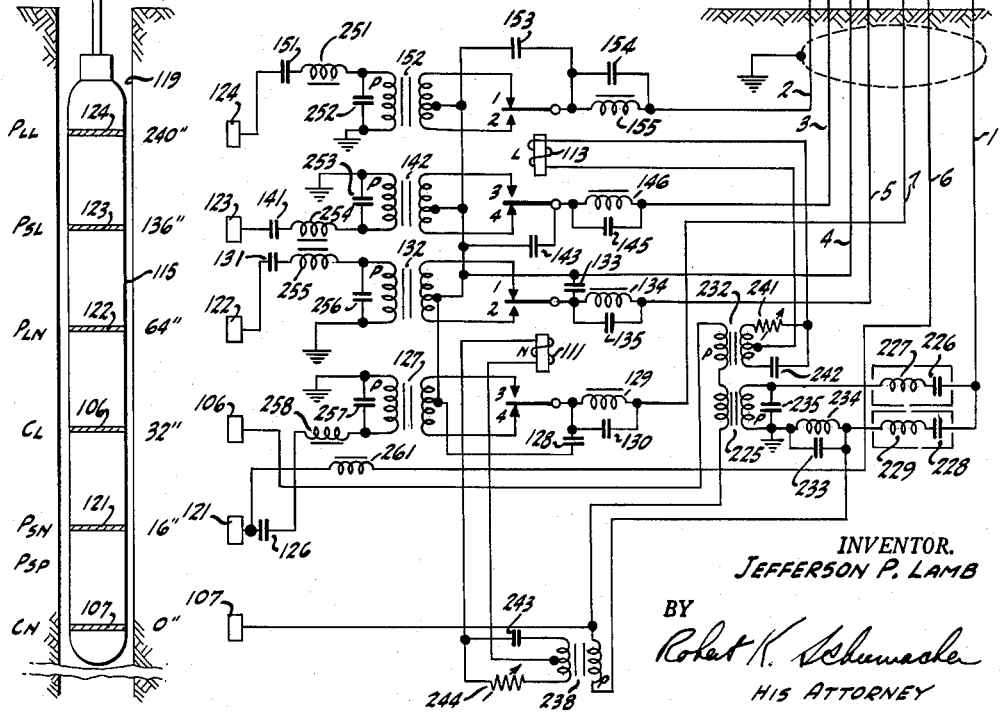
INVENTOR.
JEFFERSON P. LAMB
BY
Robert K. Schumacher
HIS ATTORNEY

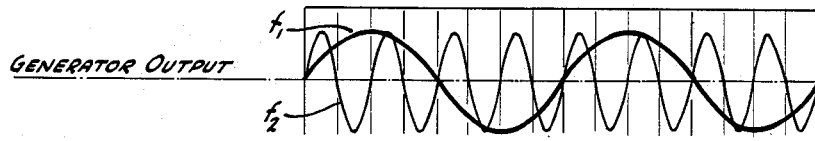
GENERATOR OUTPUT
FIG. 3a
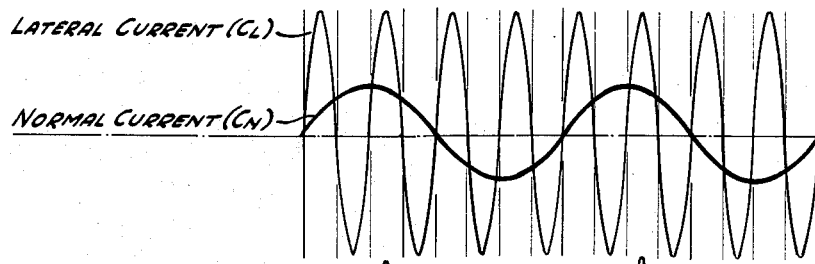
LATERAL CURRENT ($C_L$)
NORMAL CURRENT ($C_N$)
FIG. 3b
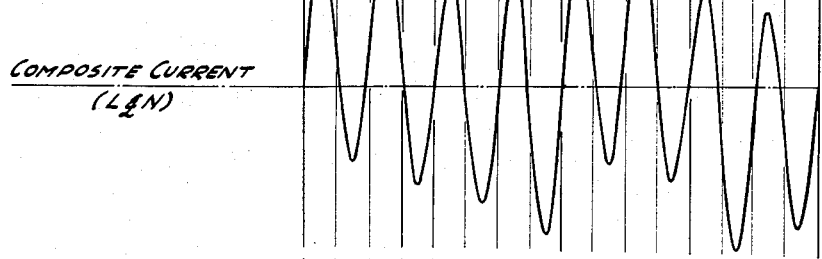
COMPOSITE CURRENT
($L \xi N$)
FIG. 3c
(LATERAL OPERATED)
CHOPPER DRIVES
(NORMAL OPERATED)
FIG. 3d
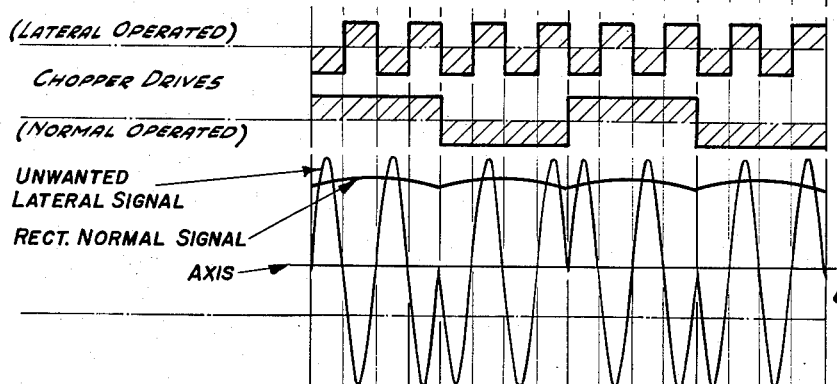
UNWANTED LATERAL SIGNAL
RECT. NORMAL SIGNAL
AXIS
FIG. 3e
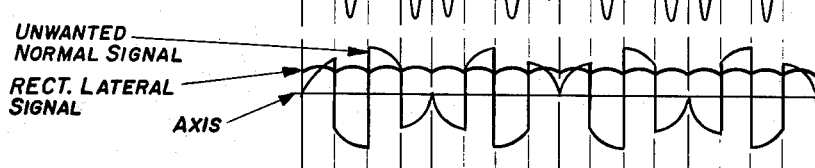
UNWANTED NORMAL SIGNAL
RECT. LATERAL SIGNAL
AXIS
FIG. 3f
EXEMPLARY NORMAL OR LATERAL GALVO. INPUTS
FIG. 3g
INVENTOR.
JEFFERSON P. LAMB
BY
HIS ATTORNEY United States Patent Office 3,121,840
Patented Feb. 18, 1964

3,121,840
ELECTRICAL LOGGING SYSTEM WITH MEANS FOR TRANSMITTING DIFFERENT CURRENTS OVER A SINGLE PAIR OF CONDUCTORS
Jefferson P. Lamb, Tulsa, Okla., assignor, by mesne assignments, to Dresser Industries, Inc., Dallas, Tex., a corporation of Delaware
Filed Dec. 30, 1959, Ser. No. 862,938
5 Claims. (Cl. 324—1)

This invention relates to electrical logging systems and more particularly to systems wherein alternating current fields of different frequencies are established in the subsurface formations.

As has been more fully developed in my co-pending application disclosing and claiming a phase discriminating electrical logging system, Serial No. 862,937, filed on an even date herewith, now U.S. Patent No. 3,069,619, issued December 18, 1962, the increasing desirability of providing both lateral and normal current fields in the subsurface formations, in order to provide normal and lateral complex of curves for lithological interpretation, has created a number of problems.

In order to avoid the necessity of switching between the normal and lateral fields with the resultant arcing and other current and signal degradation which accompanies it, the invention disclosed in my co-pending application utilizes simultaneously established, phase-displaced alternating current fields. A normal or lateral resistivity channel detects that part of the composite of the phase-displaced fields contributed by respective component. Thereafter the detected signal is synchronously rectified for transmission to the surface equipment. The synchronous rectification of a part of the composite of the phase-displaced, alternating current fields not only converts it to a D.-C. signal, which involves well known advantages for electrical logging systems, but also provides the phase discrimination necessary to separate the normal and lateral parts of the composite field.

While the system disclosed in my co-pending application constitutes a substantial improvement over existing systems wherein normal and lateral fields are established through current commutation or switching, it has certain practical limitations which are more or less inherent in using a phase discrimination electrical logging system. The principal drawback to the phase discriminating system is that it requires a careful adjustment and maintenance of phase shift in the operation of the phase discriminating means in the receiving channels. Thus, only in the situation where the relationship between the detected normal and lateral signals at the rectifier inputs and the lateral and normal rectifiers, respectively, are phase displaced by precisely 90°, and this phase displacement is maintained, is it possible to accurately correlate the rectification of the normal and lateral components of the composite signal so that the resultant outputs are a desired rectified normal signal with superimposed undesired A.C. lateral current or a desired rectified lateral current with superimposed undesired A.C. normal current. The undesired alternating components, in most cases, are eliminated by subsequent filters. However, if borehole conditions of extreme temperature, pressure, etc., conspire to vary the phase displacement between the alternating current fields as established and the coil-to-contact delays of the synchronous rectifiers, it can be appreciated that the rectifier contacts will partially rectify the unwanted signal along with the wanted signal. Once these unwanted signals are rectified, there is no way to discriminate or distinguish between the wanted signal, e.g., the normal signal, and the unwanted rectified signal, e.g., the lateral signal.

As a result of this problem, it is necessary in a phase discriminating system to closely control the phase displacement between the established fields and the action of the rectifier contacts as they are phase separated from the detected unwanted signals.

The present invention represents an improved electrical logging system in that switching between separate normal and lateral currents in order to provide the distinct field components is still unnecessary. By employing a pair of frequencies, however, the present system provides a means by which the characteristic rejection properties of synchronous rectification may be combined with tuned input filters to reduce the likelihood of rectifying a part of the unwanted signal along with the wanted signal.

The present invention employs a pair of different frequency constant current sources which are combined for transmission to the subsurface equipment over a single pair of conductors. The frequencies of the sources are chosen so that they are related as a harmonic is to its fundamental, i.e., integers. With this requirement, whenever a converter rectifies the part of the composite field established in the subsurface formation which is attributable to the normal or the lateral field, as the case may be, the unwanted signal is chopped into a plurality of superimposed A.C. waves which may be eliminated by filtering. Synchronizing the frequencies of these sources, it is possible to eliminate more easily the unwanted signal to the extent that it is not eliminated by the input filter in its particular receiving channel.

Partly in accordance with the objects of the present invention, the constant frequency signals are combined in a power amplifier-regulated current generator and supplied over a pair of conductors to the subsurface tool. At the subsurface logging tool, the two frequencies are separated by band-pass filters and applied to respective lateral and normal current electrodes for establishing in the formation simultaneously alternating current fields of the two frequencies. Cooperating with the logging tool are a plurality of lateral and normal pickup electrodes. The number of these electrodes and the number of normal and lateral receiving channels depend upon the particular number of normal and lateral resistivity curves desired. In the exemplary embodiment of the present invention, the same electrode structure cited with approval by the American Petroleum Institute and illustratively employed in my co-pending application Serial No. 862,937 is employed.

The signals detected by the lateral or normal pickup electrodes, will actually be a composite of the fields established between the normal and lateral current electrodes and ground. As an example, the particular composite field detected by one of the lateral pickup electrodes will be passed through a band-pass filter tuned to the lateral current frequency. The output from this filter will then be transformed and fed through the contacts of a synchronous rectifier which, under the control of the lateral current field, synchronously rectifies the lateral current component of the detected signal for transmission to surface recording equipment. The output of the synchronous rectifier, which may still have extraneous alternating currents superimposed upon the rectified lateral signal due to incomplete input filtering, is directed through a low-pass filter to eliminate the remaining unwanted A.C. signals prior to transmission to the surface equipment. In a similar manner, the normal pickup electrodes cooperate with band-pass filters tuned to the normal current frequency to substantially eliminate the undesired lateral signals whereby the output, after rectification and further filtering, is only the wanted normal signal.

The principal object of the present invention is to provide an improved electrical logging system wherein both normal and lateral current fields are established in the subsurface formations without requiring electrical or mechanical switching between the fields. The attainment of this object without additional circuit complexity provides a system which is more sharply selective and yet simple in operation and maintenance.

Principal features of the invention pertain to the means for relating the frequency sources by integers and combining them for transmission to the subsurface tool, the means for separating them for application to respective lateral and normal current electrodes, and the means for detecting the fields, synchronously rectifying the detected signals in response to the establishment of the fields and filtering the signals prior to transmitting them to the surface equipment as D.-C. equivalents. These features combine in various degrees to form a system capable of obtaining a maximum number of normal and lateral resistivity and spontaneous potential curves without switching electrodes or conductors.

These and other objects and features of the present invention will be more fully understood when the following detailed description is read with reference to the drawings in which:

FIG. 1 is an exemplary circuit diagram of the present electrical logging system;

FIG. 2 is a schematic representation of the logging tool, electrodes and supporting means; and, FIG. 3 illustrates exemplary wave forms at various points of the system of FIG. 1, all of which are correlated along a time axis. More particularly, FIG. 3a represents the alternating current outputs of the two current sources, FIG. 3b illustrates the lateral and normal currents flowing from lateral and normal current electrodes, FIG. 3c represents the composite of the current fields established in the subsurface formations by the current fields, FIG. 3d illustrates the operation of the synchronous rectifier contacts in the receiving channels, FIGS. 3e and 3f illustrate respectively exemplary normal and lateral channel signals after rectification, and, FIG. 3g illustrates exemplary normal and lateral signal inputs to the recording galvanometers.

Looking first to the system disclosed in FIG. 2, it can be seen to include a plurality of electrodes 106, 107 and 121–124 supported by a logging tool 115. The electrodes are marked C (current) or P (pickup) with appropriate subscripts to identify their functions in the system. The logging tool 115 is supported for movement along borehole 119 by seven-conductor cable 116 which cooperates with pulley mechanism 117 at the surface. Commutator device 118 separates the seven conductors and sheath of the cable 116 for connection to various parts of the surface equipment as illustrated.

The source of alternating current 102 is supplied to the oscillators 95 and 96 which respectively generate the preselected lateral and normal current frequencies $f_2$ and $f_1$. In the present exemplary embodiment of the system, the frequency $f_1$ might be selected as 100 cycles per second and $f_2$ as 400 cycles per second, with the higher frequency synchronized by the lower frequency as indicated by the connecting arrows 98. These frequencies are chosen in the 100 to 400 c.p.s. range in order to take advantage of simple filter design and yet keep the frequencies in the low-loss range of commercially available cables. The fixed frequency outputs from oscillators 95 and 96 are fed to the input of power amplifier 97 where they are amplified and combined for transmission to the subsurface logging tool 115 between conductor 1 and sheath ground. FIG. 3a illustrates the outputs of these sources.

Conductor 1 at the logging tool is connected to the input sides of series resonant band-pass filters tuned to the 100 and 400 c.p.s. frequencies, respectively. The L-C circuit in the 400 c.p.s. current channel includes inductor 227 and capacitor 226, and the output of this filter is connected to one terminal of the input winding of transformer 225. Conductor 1 is also connected to the input of the 100 c.p.s. tuned filter including capacitor 228 and inductor 229. The output of this series circuit is connected through a parallel L-C circuit tuned to 100 c.p.s. including capacitor 233 and inductor 234 to sheath ground. The primary winding of transformer 225 is shunted by capacitor 235 to sheath ground, the combination being tuned to 400 c.p.s. The output of the series circuit including capacitor 228 and inductor 229 is also connected to one side of the primary winding of transformer 238. The other terminal of the input winding of transformer 238 is connected directly to 0" band electrode 107 and to one side of the secondary winding of transformer 225. The other terminal of the secondary winding of transformer 225 is connected to one terminal of the primary winding of transformer 232, the other side of which is connected directly to the 32" band electrode 106.

The secondary winding of transformer 238 is associated with the coil of synchronous rectifier 111 which responds to the establishment of the normal current field to synchronously rectify detected normal signals. One side of the coil of the rectifier 111 is connected to the center tap of the secondary winding of transformer 238, and the other terminal of the coil of the rectifier 111 is connected through a variable resistor 244 to one terminal of the secondary winding of transformer 238 and through capacitor 243 to the other terminal of the secondary winding of transformer 238. In a similar manner, the secondary of transformer 232 acts to energize the coil of the rectifier 113 associated with the lateral receiving channels and for a comparable purpose for those channels. More particularly, the coil of the rectifier 113 is connected between the center tap of the secondary winding of transformer 232 and a point which is connected through a variable resistor 241 to one terminal of the winding and through a capacitor 242 to the other terminal.

With the circuit connections described above and the application of the current of two frequencies over conductor 1 to the input sides of the filters tuned to the respective frequencies, only current of frequency $f_1$ is passed by the filter including capacitor 228 and inductor 229 through the primary of transformer 238 to the normal current electrode 107. At the same time, the $f_2$ current is passed by the filter including capacitor 226 and inductor 227 and thereafter stepped up by transformer 225 and applied through the primary of transformer 232 to the lateral current electrodes 106, 107.

The lateral and normal currents as they might look at their respective electrodes 106—107 and 106 are illustrated in FIG. 3b, and FIG. 3c illustrates a composite field as it might be established in the formation adjacent the logging tool 115. Of course, as is apparent, the composite field is merely the algebraic sum of the normal and lateral currents at any instant point in the formation. Relative magnitudes will vary considerably depending upon the point picked in relation to the longitudinal positions of the current electrodes. FIG. 3c, which is merely exemplary, shows the composite as it might appear at one point. As a matter of fact, the particular combined curve represents the lateral and normal current outputs at their respective current electrodes 106—107 and 106 at which point they are amplitude related by approximately 3:1. This particular ratio with the lateral current predominant is a compromise between intercurve interference and necessary and desirable levels for the two signals. Ideally, since detected long lateral signals sometimes vary from the short normal signals by 75 or 100 to 1, it would be desirable to use a lateral current which exceeds the normal amplitude by more than 3:1; however, when the ratio is too much greater than 3:1, intercurve interference becomes excessive.

The adjustable resistor 244 and capacitor 243 in the circuit which controls the operation of the coil of synchronous rectifier 111 and the adjustable resistor 241 and capacitor 242 associated with the coil of synchronous rectifier 113 act to vary the phase or time delay between the energization of a coil and the operation of its contacts. Since there is a coil-to-contact delay of a fairly constant magnitude, adjustment of the variable resistors 244 and 241 can be made to synchronize the operation of the contacts of their associated rectifier with the establishment of the signal voltage across the contacts thereof. FIG. 3d illustrates this timed operation of the contacts of the rectifiers 111 and 113.

The normal and lateral receiving channels in the present invention are quite similar in operation and construction to those disclosed and described in my co-pending application relating to a phase discriminating electrical logging system. The major difference between the short and long lateral and normal receiving channels in the present system and their counterparts in the previous system, are the tuned filters in the receiving channel inputs. Whereas, in the phase discriminating type system there is no way to filter out the unwanted alternating current signal prior to synchronously rectifying the composite signals, by using simultaneously established, dual frequencies to obtain the composite field, it is possible to selectively filter the unwanted component prior to rectifying the desired signal. This will become more apparent in the operational description of these receiving channels to follow.

From a physical or circuit standpoint, the 240" band electrode 124 in the long lateral channel (LL) is connected through capacitor 151 and inductor 251 to one side of the primary winding of transformer 152. The other side of this winding is connected to sheath ground and is shunted by capacitor 252. The secondary winding of transformer 152 has its terminals connected, respectively, to contacts 1 and 2 associated with rectifier 113, and the center tap of the secondary winding of transformer 152 is connected through capacitor 153 to the swinger of rectifier 113. The swinger junction is connected through a parallel L-C circuit including inductor 155 and capacitor 154 to conductor 2. Considering the short lateral channel (SL), the 136" band electrode 123 is connected through a capacitor 141 and inductor 254 to one side of the primary winding of transformer 142, the other terminal of which is connected to sheath ground. A capacitor 253 shunts this primary winding of transformer 142. The terminals of the secondary winding are connected, respectively, to contacts 3 and 4 of the rectifier 113, and the center tap of the secondary winding is connected through capacitor 143 to the swinger of rectifier 113 that cooperates with the contacts 3 and 4. This swinger is thereafter connected through a parallel configuration including inductor 146 and capacitor 145 to conductor 3.

The long normal (LN) or 64" band electrode 122 is connected through capacitor 131 and inductor 255 to one side of the primary of transformer 132, the other side of which is connected to sheath ground. And again, a capacitor 256 shunts the primary winding. The secondary winding is connected, respectively, to contacts 1 and 2 of the rectifier 111 which synchronously rectifies the normal signals. The center tap of the secondary of transformer 132 is connected through a capacitor 133 to the swinger which, in turn, is connected through a parallel circuit including inductor 134 and capacitor 135 to conductor 5 of the cable. Note also that the center taps of the secondary windings of transformers 152, 142 and 132 are connected to conductor 4. In the short normal channel (SN), the 16" band electrode 121 is connected through capacitor 126 and inductor 258 to one side of the primary winding of transformer 127. Again, the other terminal of this primary is grounded and a capacitor 257 shunts the winding. The terminals of the secondary winding of transformer 127 are connected, respectively, to contacts 3 and 4 cooperating with rectifier 111, and the center tap of the secondary winding of transformer 127 is connected through a capacitor 128 to the swinger associated with these contacts 3 and 4. The swinger is thereafter connected through a parallel L-C circuit including inductor 129 and capacitor 130 to conductor 4 in the cable. The center tap of the secondary of transformer 127 is connected to conductor 7.

The spontaneous potential circuit includes electrode 121. Inductor 261 in this circuit filters out the 100 and 400 cycle currents before the S.P. signal is applied to conductor 6 for transmission to the surface equipment.

With the physical connections of the two lateral and two normal receiving channels set forth, the actual application of the signals and their utilization can be considered. The long lateral signal is detected by electrode 124 and courses D.-C. blocking capacitor 151 to the filter circuit including inductor 251, capacitor 252 and the primary winding of transformer 152, the filter being tuned to the 400 c.p.s. signal. Capacitor 151 prevents the circuit from interfering with the spontaneous potentials flowing in the earth. As a result of the above, the input to contacts 1 and 2 of the synchronous rectifier 113 is principally the detected 400 cycle signal with virtually no normal 100 c.p.s. current component. The synchronous rectifier 113, responsive to the current establishing the lateral field, synchronously rectifies this 400 cycle signal for application to conductor 2. Capacitors 153, 154 and inductor 155 form a low-pass filter which passes approximately the 0-10 c.p.s. band which represents the maximum aperiodic band width of signal after rectification encountered while logging thereby further eliminating any extraneous A.-C. signals which may have avoided the tuned input filter including inductor 251, capacitors 151, 252 and the primary winding of transformer 152. The rectified long lateral signal is thereafter transmitted over conductors 2 and 4 to the surface equipment.

Turning to the short lateral channel, the short lateral signal is detected between electrode 123 and sheath ground and applied through D.-C. blocking capacitor 141, which has the same purpose as capacitor 151, to the tuned filter including inductor 254, capacitor 253 and the primary winding of transformer 142. This filter acts in a manner similar to the one in the long lateral channel, i.e., it eliminates substantially all but the 400 cycle signal. The output of the transformer 142 is thereafter connected to contacts 3 and 4 associated with rectifier 113, the latter operating to synchronously rectify the SL signal for application to conductor 3. An output filter including capacitors 143, 145 and inductor 146 passes a 0-10 c.p.s. band thereby to eliminate any residual unwanted signals.

In the normal channels, the functional relationship between filters, etc., is the same. However, the input filters are designed to pass the 100 cycle signals and reject the others. The filter including inductor 255, capacitors 131, 256 and the input winding of transformer 132 in the LN channel, for example, passes the 100 cycle signal. It is thereafter rectified through the operation of contacts 1 and 2 associated with normal rectifier 111 and the output applied between conductors 4 and 5 for transmission to the surface equipment. The filter including inductor 134 and capacitors 133, 135 is again a 0 to 10 c.p.s. one designed to eliminate any residual unwanted signals. In the SN channel including electrode 121, the input filter is similar to the one in the LN channel but includes instead inductor 258, capacitors 126, 257 and the primary winding of transformer 127. The passed signals, after rectification, traverse the low-pass filter comprising inductor 129 and capacitors 128, 130 and are then transmitted to the surface equipment between conductors 4 and 7. FIG. 3e exemplarily illustrates the normal and lateral signals after rectification in their respective receiving channels.

While the lateral and normal receiving channels of the present invention are only similar to the receiving channels in my phase discriminating system which is described in application Serial No. 862,937, the surface equipment of the instant system is identical to that illustrated in describing the phase discriminating system. As a result, it seems unnecessary to describe the equipment in detail. Generally, however, the detected short normal signals, which are transmitted to the surface equipment between conductors 4 and 7 are applied to the SN receiving channel including a sensitivity adjuster 161, a low-pass filter 162 and a recorder 163. The SL signals, which are transmitted to the surface equipment between conductors 3 and 4, course a sensitivity adjustor 184 and filter 185 to recorder 187. The LN signals are transmitted to the surface equipment between conductors 4 and 5 and traverse a sensitivity adjustment 175 and a filter 176 before being recorded by the recorder 177. In a like manner, the LL signals, which are transmitted to the surface equipment between conductors 2 and 4, are fed through a sensitivity adjustment 191 and filter 192 to the recorder 193. On the other hand, the spontaneous potential signals, which are transmitted to the surface equipment over conductor 6, are connected through the sensitivity adjustment resistor 207, filter 208 and buck-boost circuit 216 to the recorder 206. FIG. 3f illustrates a typical input to one of the galvanometer-recorders. The only difference among the inputs would be in their amplitudes. In the case of all of these recorders, it is quite apparent that some sort of film transport can be used to permanently record the changing patterns of the short normal, long normal, short lateral, long lateral and spontaneous potential signals.

The particular surface equipment used to record the lateral and normal curves form no particular part of the invention; and, therefore, it is unnecessary to describe it in any further detail. Beyond this, reference may be made to my co-pending application for a more detailed explanation of the receiving channels' surface recording equipment. In a similar vein, the means by which the logging tool 115 is caused to traverse the extent of the borehole at varying times and rates has not been described in detail since it may be conventional and forms no necessary part of the invention.

The present invention has been disclosed with reference to a particular, exemplary system of electrode and resistivity channels. However, it should be apparent to those skilled in the art that numerous other arrangements are possible without departing from the spirit and scope of the invention. The present invention should in no way be limited to the particular exemplary embodiment except to the extent that the appended claims so require.

What is claimed is:

1. In a system for obtaining measurements correlatable with the subsurface lithology of formations surrounding a borehole comprising, in combination, a logging tool supported by a multi-conductor cable for movement along the extent of a borehole, sources of alternating current of first and second frequencies, means for harmonically relating and maintaining said frequencies with respect to each other, means including conductors in said cable for transmitting said currents to said logging tool, means associated with said logging tool to separate said first and second sources whereby normal and lateral alternating current fields are established at different points in the formations adjacent said logging tool, means associated with said logging tool to detect the composite of said alternating current fields at a plurality of points along the borehole remote from the establishing points of said fields, means to synchronously rectify the normal component and to reject the lateral component of certain ones of said detected composites and including means preceding said rectifying and rejecting means to pass only signals in the normal frequency range, other means to synchronously rectify the lateral component and eliminate the normal component of certain other ones of said detected composites and including means preceding said rectifying and eliminating means to pass only signals in the lateral frequency range, surface recording means, and means including noncurrent carrying ones of said conductors to transmit said rectified normal and lateral signals to said surface recording means.

2. In a system for obtaining measurements correlatable with the subsurface lithology of formations surrounding a borehole comprising, in combination, a logging tool including a plurality of current and pickup electrodes, means including a multi-conductor cable to support the logging tool for movement along the extent of the borehole at varying rates and times, surface equipment including a normal source of alternating current of a first frequency and a lateral source of alternating current of a second frequency, power amplifier means for combining and regulating said first and second sources, means to integrally relate said first and second frequencies, means including a pair of said conductors to connect the output of the combined sources to preselected ones of said current electrodes, said means including filters responsive to the respective frequencies of said normal and lateral sources to separate said sources for application to respective normal and lateral current electrodes, normal and lateral receiving channels including normal and lateral pickup electrodes to detect the composite of the fields emanating from the current electrodes, means cooperating with said normal channel to pass signals in a narrow frequency band including said normal current frequency and with said lateral channel to pass signals in a narrow frequency band including said lateral current frequency, means to synchronously rectify the normal and lateral parts, respectively, of said passed signals, output filter means in said normal and lateral channels to eliminate non-rectified signals, said synchronous rectifying means controlled by transformers coupled to said normal and lateral current electrode circuits, respectively, means including certain other ones of said conductors for transmitting said rectified signals to said surface equipment, and means associated therewith to individually record said signals as indications of formation resistivity.

3. In a system for obtaining measurements correlatable with the surface lithology of formations surrounding a borehole comprising, in combination, a logging tool moveable along the extent of a borehole, a first source of alternating current located at the top of said borehole, a second source of alternating current of a frequency which is an integral multiple of the frequency of said current from said first source, said second source also being located at the top of said borehole, a logging cable interconnected between said tool and said sources and containing at least a single pair of conductors, means for combining said currents from said first and second sources for transmission to said logging tool over said single pair of conductors, means including said sources and normal and lateral current establishing electrodes for establishing normal and lateral fields in the formations adjacent said logging tool, separating means located in said tool for separating the current from said first source from the current from said second source and applying said first source current to one of said electrodes and said second source current to the other of said electrodes, means associated with said logging tool to detect and to establish signals related to the composite of said fields at points along said borehole remote from the establishing points of said fields, and means for resolving at least one of said detected composite signals into normal and lateral components by rectifying the desired component and by eliminating the undesired component.

4. In a system for obtaining measurements correlatable with the subsurface lithology of formations surrounding a borehole in accordance with claim 3, wherein said resolving means synchronously rectifies said desired component and input band pass filter means tuned to the desired component of said composite signals eliminate the undesired component.

5. In a system for obtaining measurements correlatable with the subsurface lithology of formations surrounding a borehole in accordance with claim 3, wherein means associated with at least one of said detection points and filter rejection means cooperate to detect and record at surface equipment the spontaneous potentials of the subsurface formations.

References Cited in the file of this patent
UNITED STATES PATENTS

| | | |
|---|---|---|
| 2,357,177 | Doll | Aug. 29, 1944 |
| 2,779,913 | Waters | Jan. 29, 1957 |
| 2,880,389 | Ferre et al. | Mar. 31, 1959 |